United States Patent
Edwards et al.

(10) Patent No.: US 11,945,547 B2
(45) Date of Patent: Apr. 2, 2024

(54) TRANSMISSION SYSTEMS FOR VEHICLES

(71) Applicant: FREEFLOW TECHNOLOGIES LIMITED, Glasgow (GB)

(72) Inventors: Neil Edwards, Glasgow (GB); Neil MacMartin, Glasgow (GB)

(73) Assignee: FreeFlow Technologies, Limited, Glasgow (GB)

( * ) Notice: Subject to any disclaimer, the term of this patent is extended or adjusted under 35 U.S.C. 154(b) by 1032 days.

(21) Appl. No.: 16/753,937

(22) PCT Filed: Oct. 4, 2018

(86) PCT No.: PCT/GB2018/052838
§ 371 (c)(1),
(2) Date: Apr. 6, 2020

(87) PCT Pub. No.: WO2019/069084
PCT Pub. Date: Apr. 11, 2019

(65) Prior Publication Data
US 2020/0391822 A1    Dec. 17, 2020

(30) Foreign Application Priority Data
Oct. 5, 2017 (GB) ..................... 1716311

(51) Int. Cl.
B62M 9/122 (2010.01)
B62M 9/124 (2010.01)
F16H 49/00 (2006.01)

(52) U.S. Cl.
CPC ............ B62M 9/122 (2013.01); B62M 9/124 (2013.01); F16H 49/001 (2013.01); F16H 2200/2084 (2013.01)

(58) Field of Classification Search
CPC .......... F16H 49/001; F16H 2200/2069; B62M 9/122; B62M 9/124
(Continued)

(56) References Cited

U.S. PATENT DOCUMENTS 3,187,862 A * 6/1965 Walton .................. F16H 49/001
192/30 R
5,011,458 A * 4/1991 Kumm ................ F16H 37/0846
477/41
(Continued)

FOREIGN PATENT DOCUMENTS

| CN | 201247991 | 5/2009 |
| CN | 101746478 | 6/2010 |

(Continued)

Primary Examiner — Henry Y Liu

(57) ABSTRACT

The present disclosure relates to transmission systems for vehicles and especially those for use in electric bicycles, where human power is augmented with electric motor derived power. The present disclosure includes various embodiments, where the electric motor is of the harmonic drive type and wherein there is provided a secondary axle or bracket which provides the output of the systems, driven by both the manual input and the motor input, and wherein these two inputs are insulated from one another by placement of one-way clutches, between the flex-spline and the secondary axle or bracket and between the bracket and the primary drive axle. A modular assembly for such transmission systems and a method of assembly and disassembly are also disclosed.

20 Claims, 12 Drawing Sheets

(58) Field of Classification Search
USPC .......................................................... 474/139
See application file for complete search history.

(56) References Cited

U.S. PATENT DOCUMENTS

| | | | | |
|---|---|---|---|---|
| 6,012,347 | A * | 1/2000 | Hasegawa | B62D 6/10 180/443 |
| 6,100,619 | A * | 8/2000 | Buscher | F16H 1/32 310/83 |
| 11,592,056 | B2 * | 2/2023 | Rossberger | B62J 45/411 |
| 2003/0089186 | A1 * | 5/2003 | Bogelein | F16H 49/001 74/82 |
| 2004/0055404 | A1 * | 3/2004 | Mills | F16H 63/18 74/337.5 |
| 2005/0247900 | A1 * | 11/2005 | Marsh | F16K 31/047 251/77 |
| 2006/0082232 | A1 * | 4/2006 | Sesselmann | H02K 21/24 74/606 R |
| 2007/0169731 | A1 * | 7/2007 | Farah | F16H 35/008 123/90.17 |
| 2009/0009011 | A1 * | 1/2009 | Edelson | H02K 41/06 310/48 |
| 2009/0205451 | A1 * | 8/2009 | Bayer | F16H 25/06 74/439 |
| 2010/0024593 | A1 * | 2/2010 | Schmidt | F16H 25/06 74/640 |
| 2015/0369344 | A1 * | 12/2015 | Koenig | F16H 55/54 475/182 |
| 2016/0245386 | A1 * | 8/2016 | Rossberger | B62M 23/00 |
| 2017/0023109 | A1 * | 1/2017 | Ellison | F16H 15/00 |
| 2017/0167588 | A1 * | 6/2017 | Park | F16H 49/001 |
| 2017/0184190 | A1 * | 6/2017 | Klassen | F16H 49/001 |
| 2017/0356816 | A1 * | 12/2017 | D'Elia | G01L 5/0019 |
| 2018/0362115 | A1 * | 12/2018 | Tsuchizawa | B62M 6/50 |
| 2019/0308512 | A1 * | 10/2019 | Hasumi | B62M 6/45 |

FOREIGN PATENT DOCUMENTS

| | | |
|---|---|---|
| CN | 101857063 | 10/2010 |
| CN | 202449162 | 9/2012 |
| CN | 103129691 | 6/2013 |
| CN | 203332337 | 12/2013 |
| CN | 204750462 | 11/2015 |
| JP | 09169290 A | 6/1997 |
| JP | 11227665 A | 8/1999 |
| WO | WO 2012/046216 | 4/2012 |
| WO | WO2016/116226 A1 | 7/2016 |

* cited by examiner

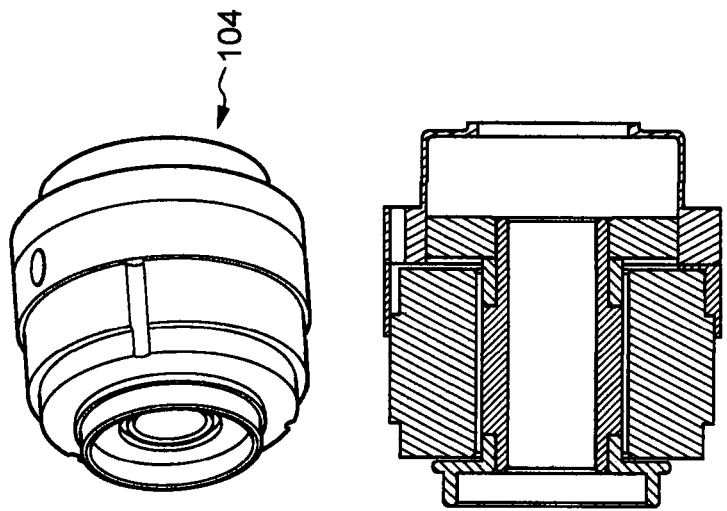
Figure 9
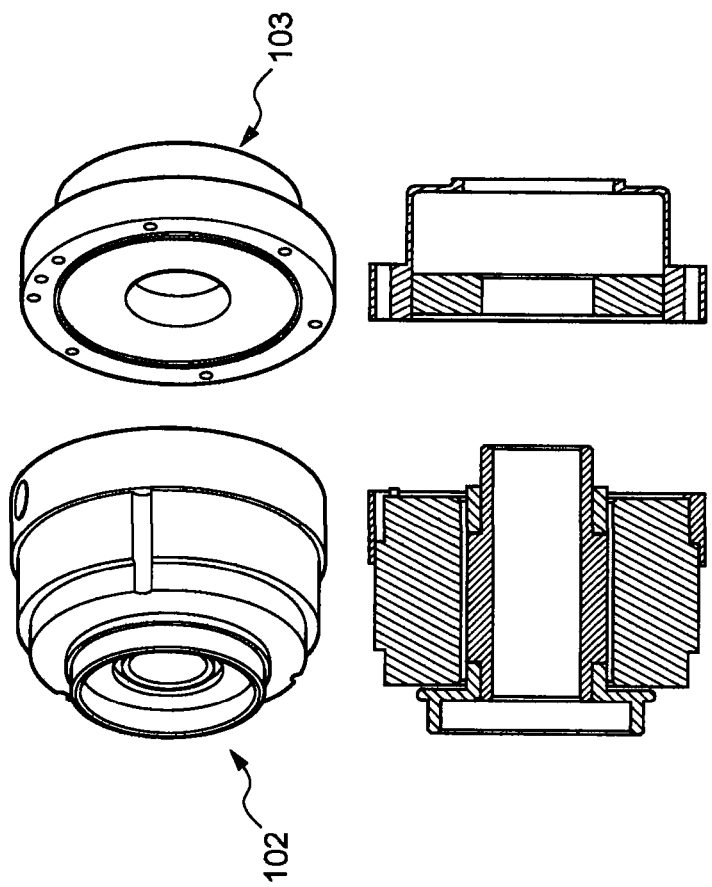
Figure 8
Figure 7

TRANSMISSION SYSTEMS FOR VEHICLES

FIELD OF THE INVENTION

The present disclosure covers a vehicle, especially an electrically assisted or powered bicycle, a transmission system usable therewith but also applicable to other applications, a control system for said vehicle, and a method of frame construction for bicycles.

BACKGROUND TO THE INVENTION

Electric bicycles are a form of dual-powered vehicles: they employ both a manual pedal and crank drive and an electric motor. These two drives may function independently of one another or may function together to augment one another's motive force. A user may choose to selectively engage the electric drive, or the electric drive may be activated automatically depending on such conditions as the measured pedal velocity, bicycle velocity, etc.

The electric drive may be located in several places; it may drive and be located within the hub of the rear wheel; it can power the pedal crank; or it may be located at some point between these two extremes, driving the chain of the bicycle. An alternative is to drive the front wheel, but this brings its own drawbacks.

The power source, usually a rechargeable battery, has to be located on the bicycle, and usually a bulky battery will be placed over or around the rear wheel.

Harmonic drives have been proposed as a method of providing the motorised input to such transmission systems, and placing these around the outside of the main drive axle.

However, current known methods are unsatisfactory as they are difficult to fit within the frame of a bicycle at that point, as they tend to increase the Q-Factor (i.e. the distance between the outside of the pedal cranks at the pedal hole) beyond a point which the rider finds comfortable or stable.

Moreover, they may be difficult to service or repair as their disassembly and reassembly may be complicated and beyond the ability of a user's local bicycle repair or servicing person.

SUMMARY OF THE INVENTION

According to a first aspect of the present invention there is provided a transmission system comprising at least two rotational inputs, and at least one rotational output, one of the rotational inputs being a harmonic drive, the harmonic drive including a flex-spline, the flex-spline surrounding a drive axle of the other rotational input, the flex-spline being rotationally coupled to a first one-way clutch, the first one-way clutch being mounted around and rotationally coupled to a bracket, and a second one-way clutch being mounted within a housing defined within the bracket, and wherein the second one-way clutch is rotationally coupled to the drive axle.

The flex-spline may be fixed to the outer race of the first one-way clutch.

The flex-spline may define a locus within its interior and the first one-way clutch may be located within that locus.

The second one-way clutch may be located within that locus.

The bracket may be substantially located within that locus.

The electric motor may be substantially located within that locus.

The bracket may comprise a cylindrical one-way clutch housing and a cylindrical one-way clutch mounting.

The bracket comprises a cylindrical one-way clutch housing and a cylindrical one-way clutch mounting, and wherein the cylindrical one-way clutch mounting and cylindrical one-way housing are co-radial.

By "co-radial" it will be understood that they are both coaxial and are located progressively outwardly from a central axis around which they are mounted.

The bracket may comprise a cylindrical one-way clutch housing and a cylindrical one-way clutch mounting, and wherein the cylindrical one-way clutch mounting and cylindrical one-way housing may be capped by a flange.

A cylindrical projection may extend from said flange, oppositely from the cylindrical mounting and housing.

The cylindrical projection may be of a lesser diameter than the cylindrical mounting.

The cylindrical projection may be of a lesser diameter than the cylindrical housing.

The cylindrical projection may include a gear mounting.

The transmission system may be adapted to be used in hybrid drive vehicles in which rotational inputs may be from power selected from the group comprising: internal combustion, electrical, manual, and KERS.

The transmission system may be adapted to be used in hybrid drive vehicles and specifically an electric bicycle, and may include an electrical motor rotational input and a manual rotational input from a pedal crank arrangement.

The transmission system may be generally cylindrical.

The transmission system may have a a maximum length of 170 mm, without including the widths of the pedal cranks.

The transmission system may have a length of between 60 mm and 170 mm.

The transmission system may have a length of between 108 mm to 127 mm.

The transmission system may have a length of around 125 mm.

The transmission system may have a maximum outer diameter of 108 mm.

The transmission system may have an outer diameter of between 68 mm and 108 mm.

The transmission system may have an outer diameter of between 80 mm to 110 mm.

The transmission system may have an outer diameter of around 90 mm.

The transmission system may be wholly contained within the bottom bracket shell of a suitable standard framed bicycle.

Such a bottom bracket shell may have a corresponding Q-Factor of between 140 and 172 mm.

The bottom bracket shell may have an outer diameter of between 70 mm and 110 mm.

The transmission system may further include a crank speed sensor.

The crank speed sensor may employ a magnetic field to derive rotation speed.

The crank speed sensor may employ a magnetic field to derive rotation direction.

The crank speed sensor may feed into a motor controller to control the rotational input provided by the electric motor.

According to a second aspect of the present invention there is provided a bicycle including at least one transmission system according to the first aspect.

According to a third aspect of the present invention there is provided a vehicle including at least one transmission system according to the first aspect.

According to a fourth aspect of the present invention there is provided a transmission system comprising at least two rotational inputs, and at least one rotational output, one of the rotational inputs being a harmonic drive, the harmonic drive including a flex-spline, and an electric motor, wherein the transmission system has a modular construction comprising a first module and a second module, wherein the first module houses the flex-spline and the second module houses the electric motor, the two modules being selectively detachable.

The first module may have a first module outer housing.

The second module may have a second module outer housing.

The first module outer housing may have a cylindrical shape.

The second module outer housing may have a cylindrical shape.

The second module outer housing may have a boss extending from it.

The boss may be adapted to receive at least a portion of the first module outer housing.

One of the modules may have one or more pins or bolts extending from it to enable mechanical attachment of the two modules.

The other of said modules may have corresponding receiving apertures for said pins or bolts.

Nuts or other suitable mechanical fasteners may be used to secure the two modules.

The boss and/or outer housing of the first one way module may be provided with a socket and groove feature to enable proper alignment of the two modules.

The first module may additionally house a drive axle.

The first module may include one or more one-way clutches.

The first module may house a flex-spline of a harmonic drive.

The first module may house the circular spline, wave generator and flex-spline of a harmonic drive.

The second module may house an electric motor.

The flex-spline may be rotationally coupled to a first one-way clutch, the first one-way clutch being mounted around and rotationally coupled to a bracket, and a second one-way clutch being mounted within a housing defined within the bracket, and wherein the second one-way clutch is rotationally coupled to the drive axle.

The flex-spline may be fixed to the outer race of the first one-way clutch.

The flex-spline may define a locus within its interior and the first one-way clutch may be located within that locus.

The second one-way clutch may be located within that locus.

The bracket may be substantially located within that locus.

An end cap may be provided to cover and attach to a non-chain-ring side of a bottom bracket shell.

The modular construction may allow for servicing of the transmission system.

The first module may be simply detached from the transmission system by unfastening the mechanical fasteners and removing it from the boss/bottom bracket shell, and the opposite method for reattachment.

According to a fifth aspect of the present invention there is provided a bicycle including at least one transmission system according to the fourth aspect.

According to a sixth aspect of the present invention there is provided a vehicle including at least one transmission system according to the fourth aspect.

According to a seventh aspect of the present invention there is provided a transmission system for an electric bicycle comprising a first module and a second module, the modules being selectively detachable, wherein the first module has a first module outer housing, the second module has a second module outer housing, the first module outer housing having a cylindrical shape, the second module outer housing also having a cylindrical shape, the second module outer housing having a boss extending from it and wherein the boss is adapted to receive at least a portion of the first module outer housing.

One of the modules may have one or more pins or bolts extending from it to enable mechanical attachment of the two modules.

The other of said modules may have corresponding receiving apertures for said pins or bolts.

Nuts or other suitable mechanical fasteners may be used to secure the two modules.

The boss and/or outer housing of the first one may module maybe provided with a socket and grove feature to enable proper alignment of the two modules.

The first module may additionally house a drive axle.

The second module may include a drive axle receiving aperture through its centre.

The first module may include one or more one-way clutches.

The first module may house a flex-spline of a harmonic drive.

The first module may house the circular spline, wave generator and flex-spline of a harmonic drive.

The second module may house an electric motor.

The flex-spline may be rotationally coupled to a first one-way clutch, the first one-way clutch being mounted around and rotationally coupled to a bracket, and a second one-way clutch being mounted within a housing defined within the bracket, and wherein the second one-way clutch is rotationally coupled to the drive axle.

The flex-spline may be fixed to the outer race of the first one-way clutch.

The flex-spline may define a locus within its interior and the first one-way clutch may be located within that locus.

The second one-way clutch may be located within that locus.

The bracket may be substantially located within that locus.

The modular construction may allow for servicing of the transmission system.

The first module may be simply detached from the transmission system by unfastening the mechanical fasteners and removing it from the boss/bottom bracket shell, and the opposite method for reattachment.

According to an eighth aspect of the present invention there is provided a bicycle including at least one transmission system according to the seventh aspect.

According to a ninth aspect of the present invention there is provided a vehicle including at least one transmission system according to the seventh aspect.

According to a tenth aspect of the present invention there is provided a method of assembly of a transmission system according to either of the fourth or seventh aspects comprising the steps of:
  attaching the first module to the second module by sliding the first module cylindrical housing axially into engagement with the second module;
  forming a mechanical fastening between first and second modules.

The first module may be attached such that its housing is at least partially received by a boss extending from the second module.

A crank axle provided on the first module may be received by a crank axle aperture provided through the second module.

The transmission system may then be attached into a bicycle having a bottom bracket shell by inserting the transmission system into the bottom bracket shell, and providing one or more end caps to hold the transmission unit within the bottom bracket shell.

It will be appreciated that reversal of these steps may provide a further method of disassembly.

BRIEF DESCRIPTION OF THE DRAWINGS

Embodiments of the invention will now be described, by way of example only, with reference to the following drawings, in which:

FIG. 7 is a perspective view and a sectional side elevation of the motor assembly of the transmission system;

FIG. 8 is a perspective view and a sectional side elevation of the gearbox assembly of the transmission system;

FIG. 9 is a perspective view and a sectional side elevation of the motor gearbox assembly of the transmission system;

Figure 1:
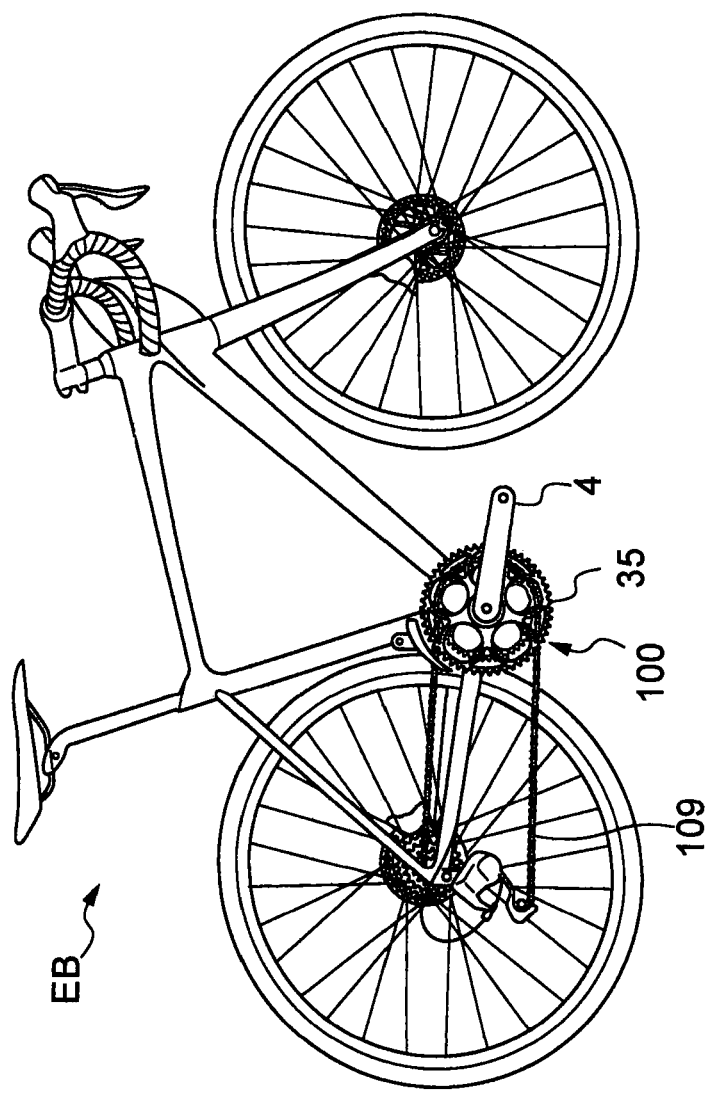
FIG. 1 shows a side view of an electric bicycle EB with a transmission system of the present invention located in the bottom bracket shell.
Figure 3:
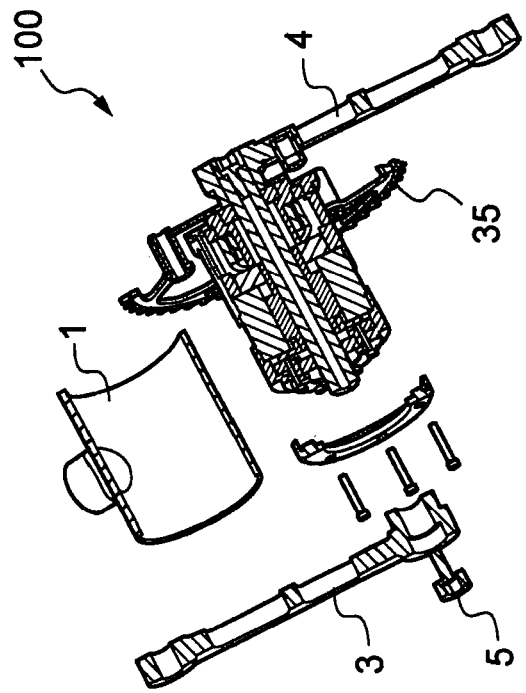
FIG. 3 partially exploded perspective sectional view of a transmission system according to the present invention alongside the bottom bracket of a bicycle frame.
Figure 2:
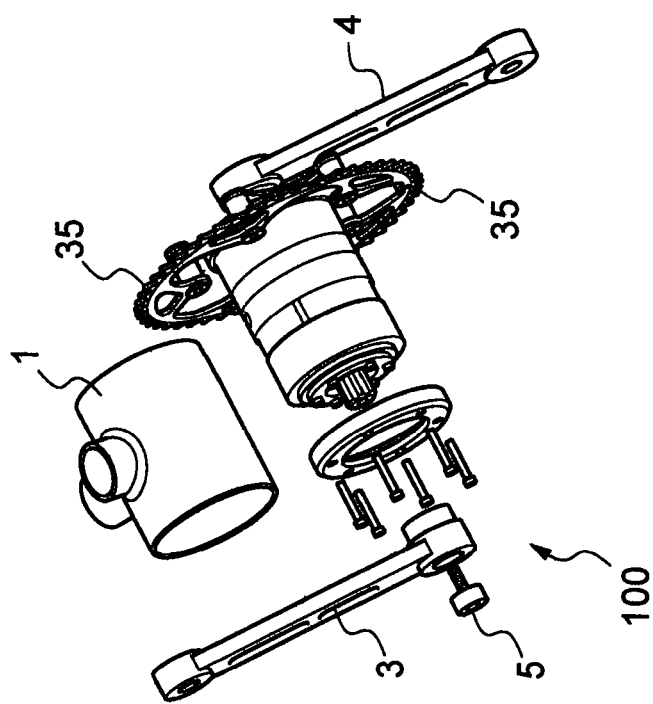
FIG. 2 shows a partially exploded perspective view of a transmission system according to the present invention alongside the bottom bracket of a bicycle frame.
Figure 4:
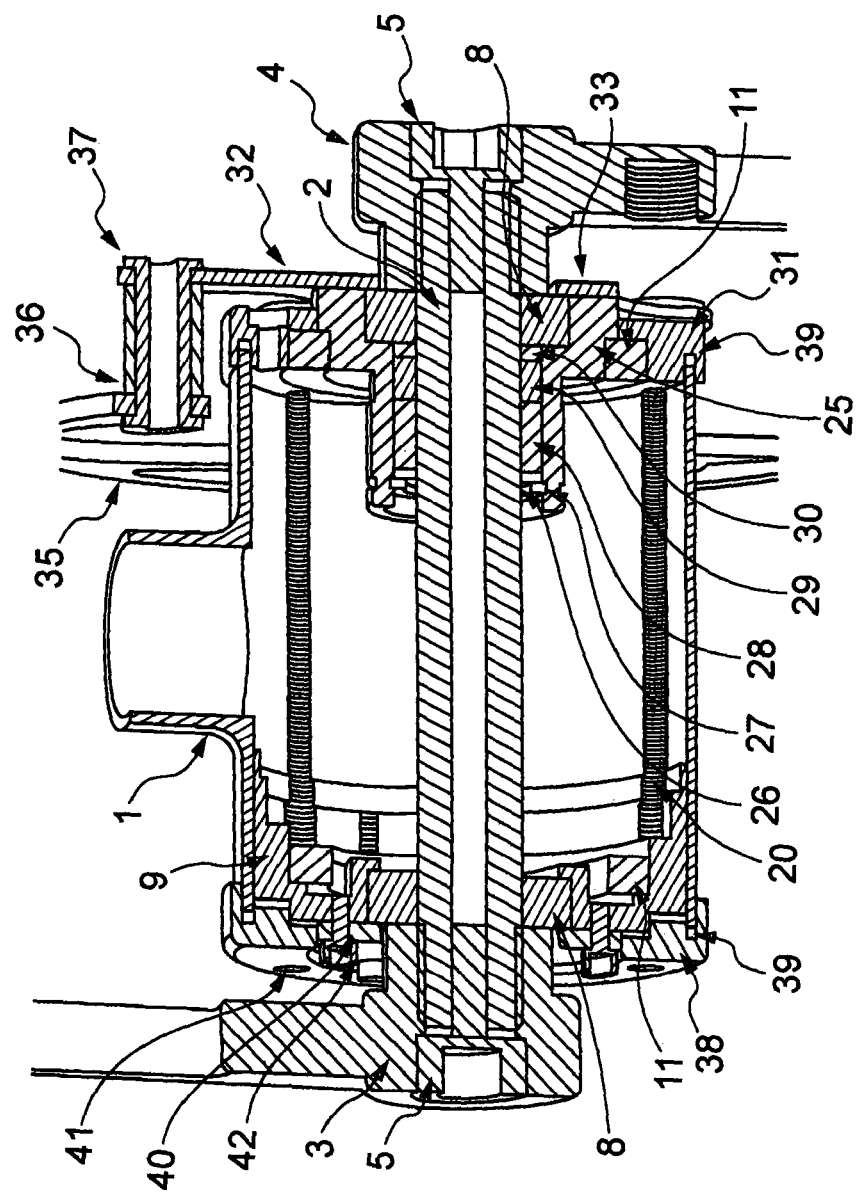
FIG. 4 is a perspective sectional view of the transmission system with the harmonic drive and electric motor components omitted for clarity.
Figure 6:
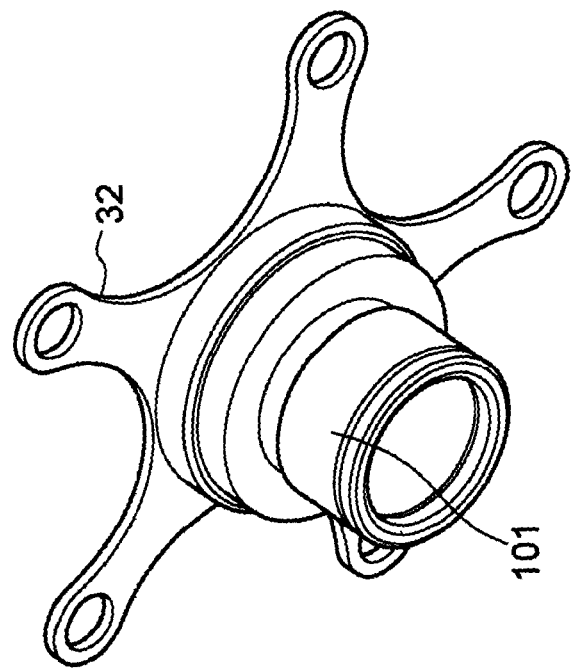
FIG. 6 is a further perspective view of the bracket and spider assembly of the transmission system.
Figure 5:
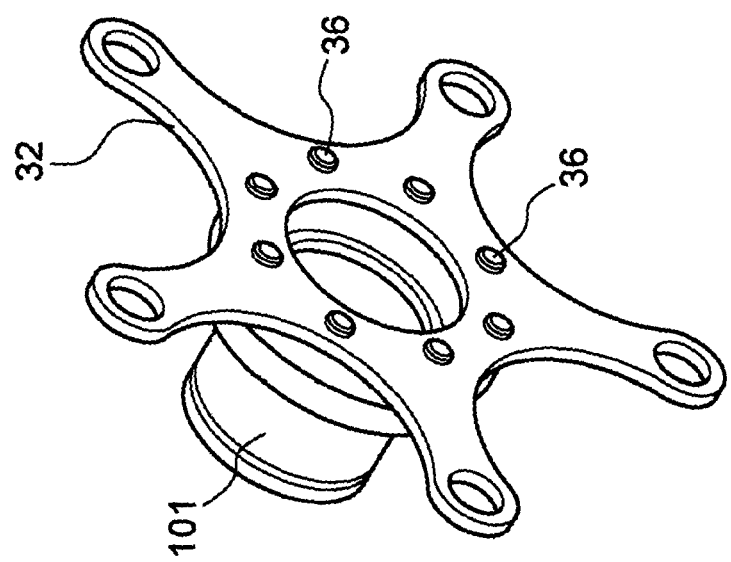
FIG. 5 is a perspective view of the bracket and spider assembly of the transmission system.

Table 1: located in the annex of the present application includes a parts list for the drawing of FIG. 4.

Figure 10:
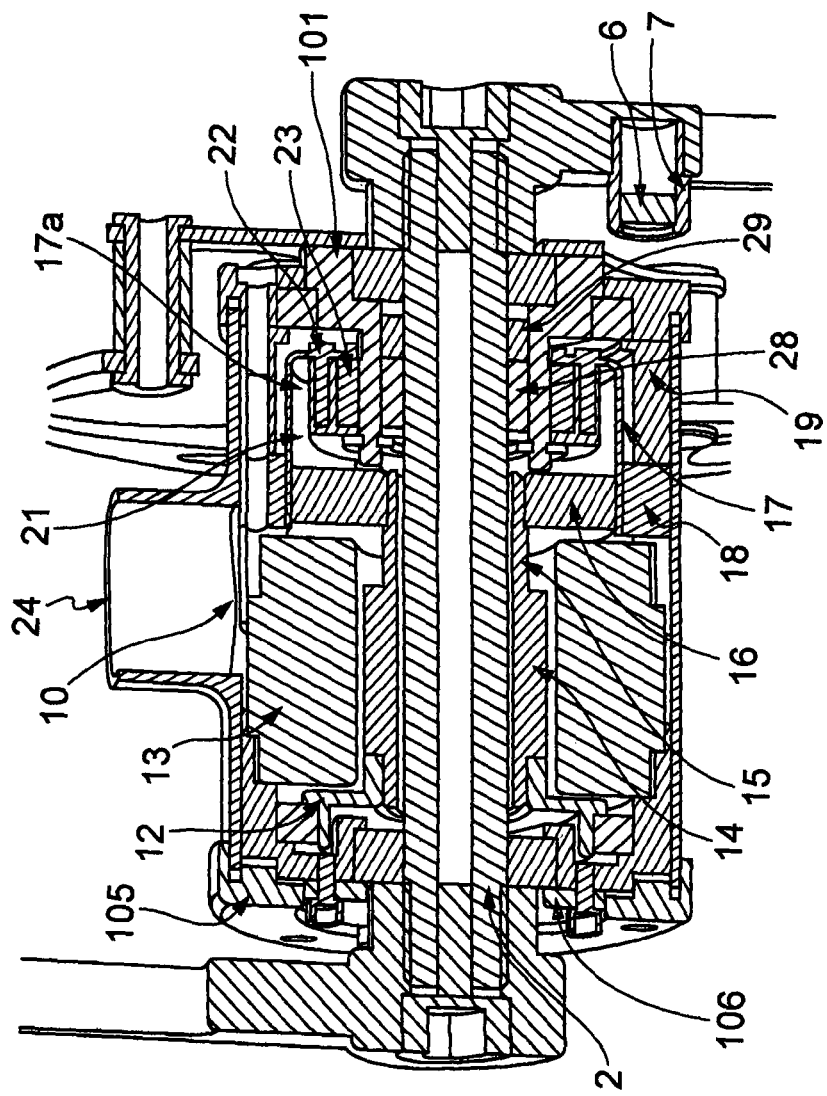
FIG. 10 is a sectional perspective elevation of the transmission system.

FIG. 10 depicts a simple dual-powered drive train transmission system according to the present invention, generally referred to as 100. The transmission system 100 is provided on an electric bicycle EB allowing dual input drives into the bicycle's chain ring 35.

The two rotational inputs to the transmission are electric motor power and human power. Electric motor 102 provides the former through the gearbox 103 in the present embodiment, but it will be understood by the skilled addressee the invention is not limited to such inputs. Pedal cranks 3,4 allow for the transmission of human powered rotation and torque into the transmission system 100; but again, the skilled addressee will appreciate that alternative forms and sources of rotational input are possible and within the scope of the present invention.

The transmission system 100 is largely contained within the bottom bracket shell 1 of electric bicycle EB.

A main axle 2 is positioned within the bottom bracket shell 1 and substantially within the confines of the transmission system 100. Pedal cranks 3,4 attach at either end of the main drive axle 2 (using axle bolts 5) on the distal portions located outside the locus of the bottom bracket shell 1.

A steel race 25 and aluminium spider 32, assembled using bolts 33, henceforth referred to as the secondary axle or bracket 101 and chain ring 35 are mounted adjacent the pedal crank 4 located on the right hand side of the transmission system 100 per the layout of FIG. 10. The secondary axle 101 functions as a secondary axle and spider. This is the "drive side" of the system 100, as the rotational output of the system is transmitted to the secondary axle 101/chain ring 35 assembly which in turn drives chain 109.

Electric motor 102 is located within the bottom bracket shell 1 and includes motor windings 13, motor rotor magnet set 14 and motor rotor 15, the non-drive side of which is coupled with a motor mount 12, that locates through a bearing 11, to the end cap 9, the drive side coupling with the Harmonic wave generator 16.

Motor 102 is used to provide additional assistance when the rider is pedalling. The motor 102 is preferred to be a three phase D.C. Motor, rotating at around 3000 to 6000 rpm.

The harmonic drive consists of three main component assemblies, the inner wave generator 16, the harmonic flex-spline 17, and the outer harmonic circular spline 18. The harmonic flex-spline 17 and the harmonic circular spline 18, have gear teeth, the harmonic circular spline 18 having one extra tooth to derive the gear reduction, enabling the harmonic flex-spline 17 to miss one or more teeth on each rotation.

Throughout operation, the harmonic circular spline 18 remains stationary, being sandwiched between, and directly coupled to the motor 102 through the transmission central ring 10 on through bearing retainer 19 on the non-drive side and the end cap 31 on the drive side.

The wave generator 16 input is directly driven by the motor 102, and will rotate at the same speed as the motor 102. The harmonic flex-spline 17 is used to efficiently reduce the motor input rotation speed by a factor of around 50 to 66 times, to around 80 to 90 rpm. Other Motor/Harmonic pairings are possible, matching the speed torque input to the desired output.

The ratio of teeth is important in calculating the speed ration:

$$\text{reduction ratio} = \frac{\text{flex spline teeth} - \text{circular spline teeth}}{\text{flex spline teeth}}$$

The harmonic flex-spline 17 in turn houses a steel sprag clutch outer race 21 of hardened steel, secured with bolts 22 that in turn houses a first one-way clutch 23 being a motor sprag clutch 23, which in turn drives the secondary axle or bracket 101. The motor 102 and harmonic drive gearbox 103 are mounted in-line i.e. co-axially. An outer circlip 24 is located on the outside of the steel section 25 of the secondary axle to prevent the harmonic flex-spline drifting towards the non-drive side and into the motor windings 13.

As can be seen from the Figures, the flex-spline 17 defines a flex-spline locus 17a within its interior, and the one-way clutch 23 is located within this locus 17a.

Furthermore, the secondary axle or bracket 101 is substantially located within this locus 17a.

An end cap 9 is located on the non-drive side and this, along with the motor 101, a transmission central ring 10, a harmonic circular spline 18, bearing retainer 19 and an end cap 31 on the drive side are secured in line with transmission bolts 20 to form the transmission assembly 100.

Rotary bearings 11 are used to mount the motor mount 12 on the non drive side, and the secondary axle 101 on the drive side, constrained within the non-drive side end cap 9, and the drive side end cap 31.

When the transmission system 100 is used in a non-assist, mode, i.e. where only human power input is used to propel the bicycle EB: Cranks 3, 4 drive standard axle 2 (here drawn at diameter 19 mm), in turn driving the secondary axle 101 assembly driving a standard chain ring 35 (typically 4 bolt 108 BCD, or 5 bolt 110 or 130 BCD) through either 1 or 2 simple sprag clutches.

The present embodiment uses two off-the-shelf inner sprag clutches wide 28 and thin 29 with spacers thin 27 and thick 30 on either side, held in place with an inner circlip 26 to handle the increased torque required for a 19 mm diameter main axle 2. Two sprag clutches 28, 29 are employed in the present embodiment, although one may suffice.

As can be seen from the Figures, and especially FIGS. 4 and 10, the sprag clutches 28, 29 are also located within the locus 17a of the harmonic flex-spline 17. The two sprag clutches 28, 29 are rotationally coupled to the drive axle 2 and to the bracket or secondary axle 101, such that forward pedalling off the cranks 3,4 causes a rotational motion/torque to be transmitted from the drive axle 2 to the secondary axle 101. Because one-way sprag clutches 28,29 are employed, rearward pedalling of the cranks 3,4 disengages this connection and prevents rearward motion or an opposing torque to be transmitted to the bracket/secondary axle 101.

As can be seen from the Figures, and especially FIG. 10, the one-way sprag clutches 23, 28 and 29 are located radially outwardly from the main axle 2, with the secondary axle/bracket 101 being sandwiched between the inner main axle 2 side clutches 28, 29 and the outer flex-spline 17 side clutch 23. This reduces the width of the transmission system 100, as measured along the axle 2, thereby allowing it to better fit within a bottom bracket shell 1 of the bicycle EB.

Axle(s) and Crank(s) are joined by means of any one of the standard configurations being typically ISIS, Square Taper, 8 Spline or similar set ups.

It may be important that the electric motor 102 derived rotational input engages only once a predetermined speed has been reached, or indeed simply sensing that the user is applying manual torque in the form of a rotational input and therefore wishes to move forward, and further, it may be desirable that the electric motor 102 derived rotational input disengages once a second predetermined speed has been reached, such that the electric bicycle does not attain velocities unlawful or unsuitable for such a vehicle.

Speed sensing is achieved as follows: pedal crank 3,4 are handed right and left, and typically composed of an aluminium material, a non-ferrous material therefore being non-permeable to magnetic fields.

A speed sensor magnet 6 is secured into the crank 4 with an aluminium speed sensor magnet retainer 7. In the present embodiment, the transmission system has magnet/retainers in crank 4 only, but may be located in the non-drive side or on both sides in alternative embodiments.

Speed sensors (not shown) are mounted in the end cap opposite to the speed sensor magnet 6, and are totally static within the set up, being located within the drive side end cap 31 at a distance not exceeding 25 mm, located at positions 11 and 1 as if on a clock face and allowing the detection of the magnetic field set up from the rare earth magnet that forms the speed sensor magnet 6, as they are both mounted on the same diameter from the central axle axis. In the present embodiment there are three such speed sensors.

It will be understood that increasing the number of speed sensors beyond three should increase the accuracy of the derived motion. Moreover, it may be beneficial to locate the speed sensor magnet 6 and the speed sensors on the crank side opposite the chain ring side.

The aluminium part of the secondary axle 101 rotates within the field of detection, but does not interfere with the magnetic field or the detection ability of the speed sensor 34.

As the cranks 3,4 rotate, the speed sensor magnet 6 also rotates, and as it rotates towards the static speed sensor 34, the strength of the magnetic field increases, to a peak when the speed sensor magnet 6 is directly in front of the speed sensor 34. As the speed sensor magnet 6 continues to rotate past and away from the speed sensor 34, the strength of the magnetic field fades.

The speed sensor 34 is connected directly to a main electronics Motor Control Board (not shown) on the bicycle, and the continuous data feed of on/off signals to the Motor Control Board, is fed into an algorithm that enables the on board computer to know whether the cranks 3,4 are being rotated by the user and the speed of rotation.

When the cranks 3,4 are detected to be rotating, and/or at a sufficient speed, the motor 40 can be activated to provide a rider motor assist, through the harmonic drive components 16 and 18, through the motor sprag clutch 23, to the steel section 25 of the secondary axle 101, through the aluminium section 32 of the secondary axle 101 to the chain ring.

When the cranks 3,4 are detected to have stopped rotating, and/or at an insufficient speed, the motor 102 can be deactivated to stop providing the rider motor assist, through the gearbox 103, through the outer sprag clutch to the steel section of the secondary axle 101.

Figure 11:
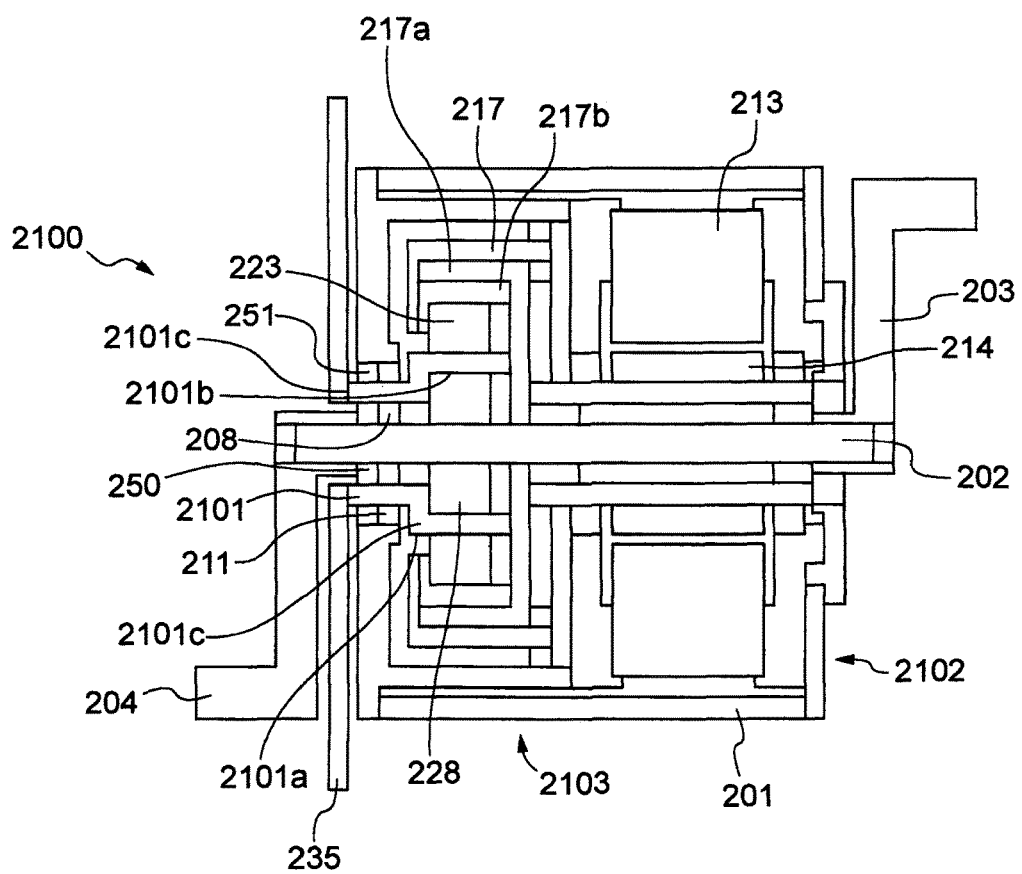
FIG. 11 is a schematic representation of a second embodiment transmission system according to the present invention.

A second embodiment transmission system 2100 is depicted in FIG. 11. Identical or similarly functioning integers employ a similar numbering scheme albeit prefixed with a "2" or a "20", such that the flex-spline become 217, and the bracket/secondary axle becomes 2101. Similarly functioning components will not be described further as that may be inferred from the above description in relation to the first embodiment.

The second embodiment transmission system 2100 likewise comprises a main crank drive axle 202, powered by cranks 203, 204, and a harmonic drive unit including a flex-spline 217, the flex-spline 217 defining a locus 217a.

A bracket or secondary axle 2101 is located substantially within the locus 217a of the flex-spline 217.

A flex-spline coupling 217b is rotationally coupled to the flex-spline 217. The first one-way clutch 223 is rotationally coupled to the flex-spline coupling 217b and in turn to the bracket or secondary axle 2101, by being mounted around a cylindrical mounting 2101*a* defined by the outer surface of the bracket 2101.

A single inner one-way sprag clutch 228 is provided within and rotationally coupled to a cylindrical housing 2101*b* defined within the bracket 2101, with the interior one-way sprag clutch 228 being rotationally coupled to the main crank axle 202.

The bracket 2101 includes a flange 2101*c* at its approximate midpoint, which caps the housing 2101*b*. A cylindrical projection 2101*c* extends from the bracket 2101 and upon which the spider/chain ring are mounted at the distal end which projects out of the bottom bracket shell 201. Two simple bearings 208, 211 are provided around and within the cylindrical projection 2101*c*, locating it around the crank axle 202 and within the bottom bracket shell side orifice. Two corresponding seals 250, 251 are provided adjacent the simple bearings 208, 211 to mitigate ingress of foreign material into the bottom bracket shell.

In this embodiment, the diameter of the cylindrical projection 2101*c* is less than that of the cylindrical mounting 2101*a*. Furthermore, it is less than that of the cylindrical housing 2101*b*.

Both one-way sprag clutches 223, 228 are located within the locus 217*a* of the flex-spline 217. Moreover, the bracket 102 is also mainly located within this locus 217*a*, albeit the cylindrical projection 2101*c* is not.

It will also be noted that both one-way sprag clutches 223, 228 are located coaxially and radially outwardly from the crank axle 202.

Figure 12:
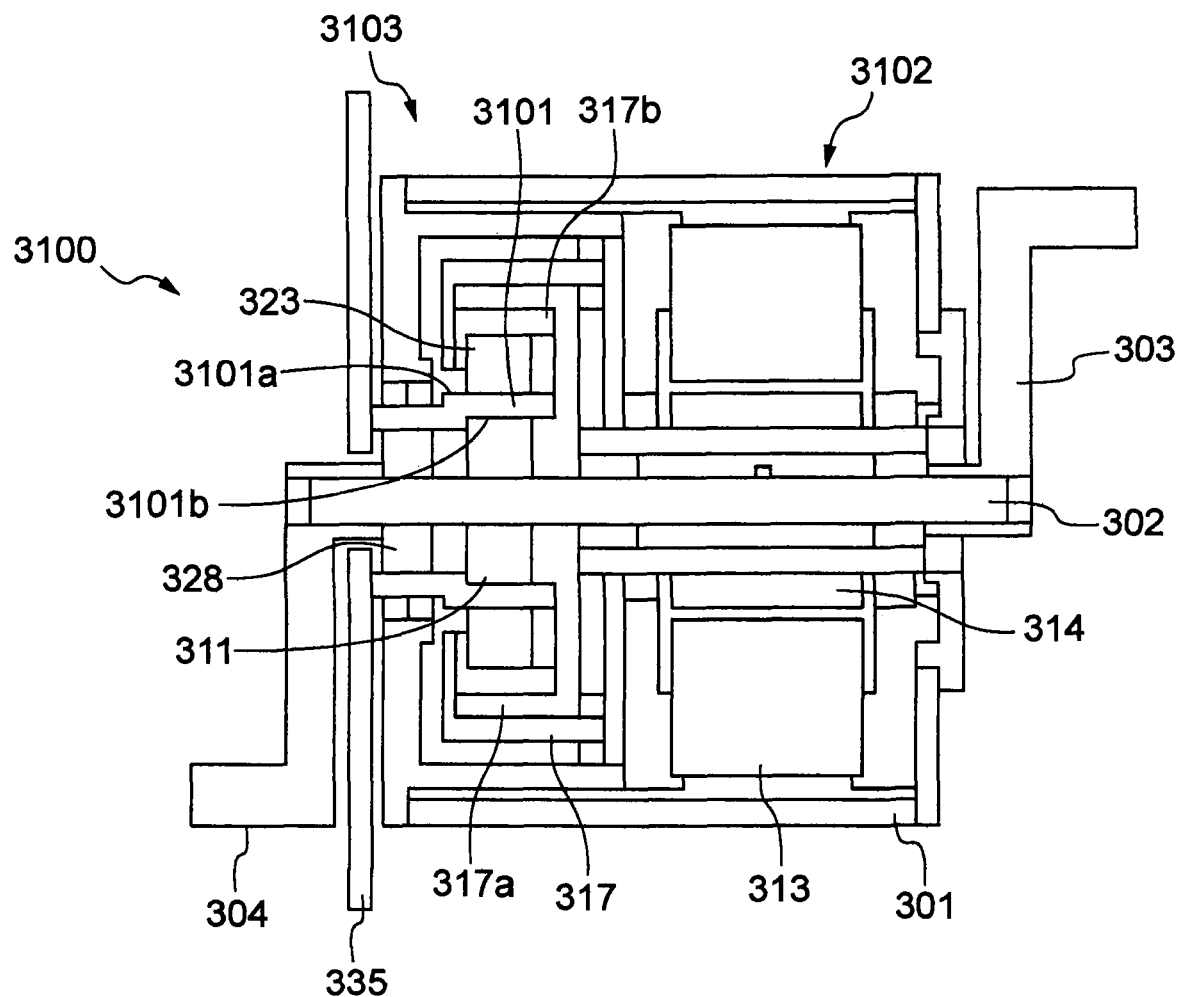
FIG. 12 is a schematic representation of a third embodiment transmission system according to the present invention.

A third embodiment transmission system 3100 is depicted in FIG. 12. Identical or similarly functioning integers employ a similar numbering scheme albeit prefixed with a "3" or a "30", such that the flex-spline become 317, and the bracket/secondary axle becomes 3101. Similarly functioning components will not be described further as that may be inferred from the above description in relation to the first and/or second embodiment.

The third embodiment is largely similar to the second albeit with several key differences.

First, the inner one-way sprag clutch 328 is located within the cylindrical projection 3101*c*, with a corresponding simple bearing 308 replacing it within the cylindrical housing 2101*b*.

The first one-way clutch 323 is still mounted around the cylindrical mounting 3101*a* and within the flex-spline locus 317*a*.

Figure 13:
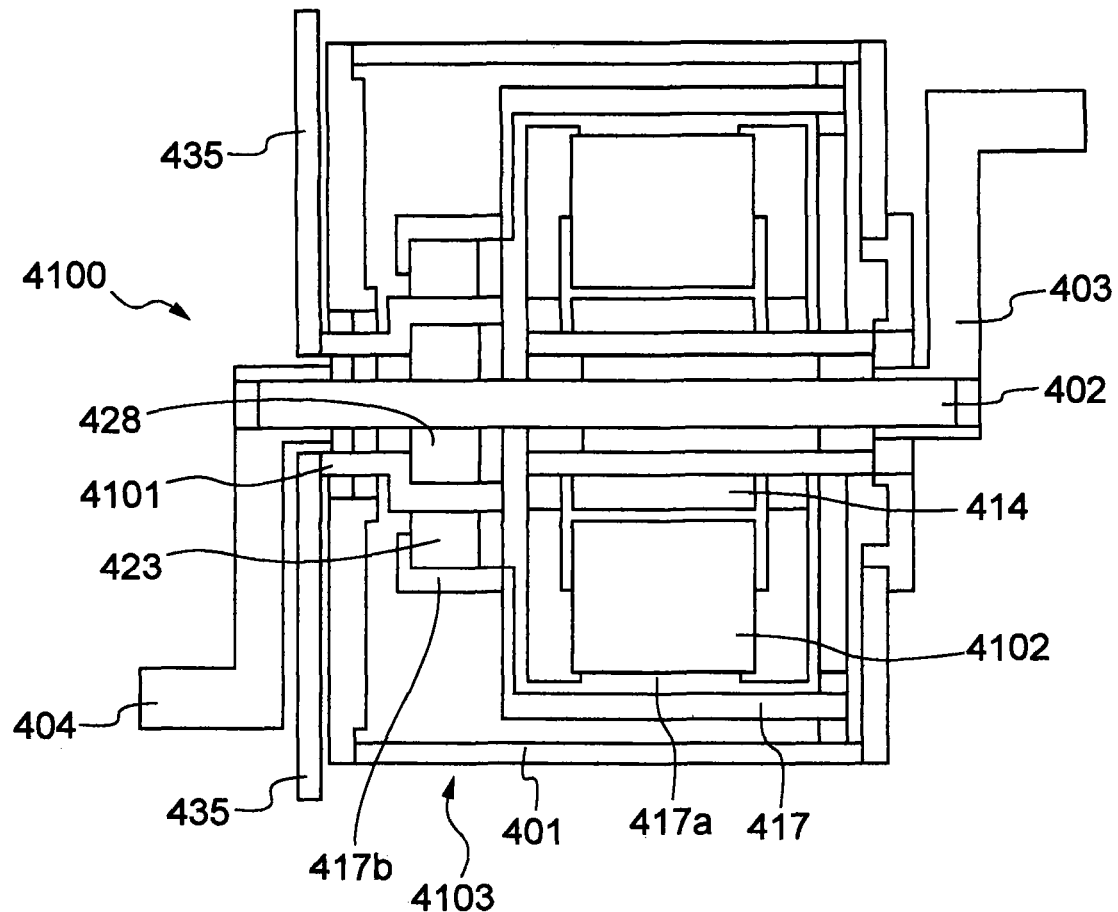
FIG. 13 is a schematic representation of a fourth embodiment transmission system according to the present invention.

A fourth embodiment transmission system 4100 is depicted in FIG. 13. Identical or similarly functioning integers employ a similar numbering scheme albeit prefixed with a "4" or a "40", such that the flex-spline become 417, and the bracket/secondary axle becomes 4101. Similarly functioning components will not be described further as that may be inferred from the above description in relation to the first, second and/or third embodiments.

The fourth embodiment differs mainly in that the components of the electric motor assembly 4102 are housed within the locus 417*a* that the flex-spline 417 defines. The coupling 417*b* is attached to the flex-spline 417 which then attaches to the first one-way sprag clutch 423, which in turn attaches to the bracket/secondary axle 4101, which in turn attaches to the second/inner one-way sprag clutch 428, which in turn attaches to the main pedal crank axle 402.

Although the one-way bearing assembly is located outside the locus 417*a* of the flex-spline 417, it will be appreciated that housing the motor components within this locus achieves a similar axial space saving effect.

Figure 14:
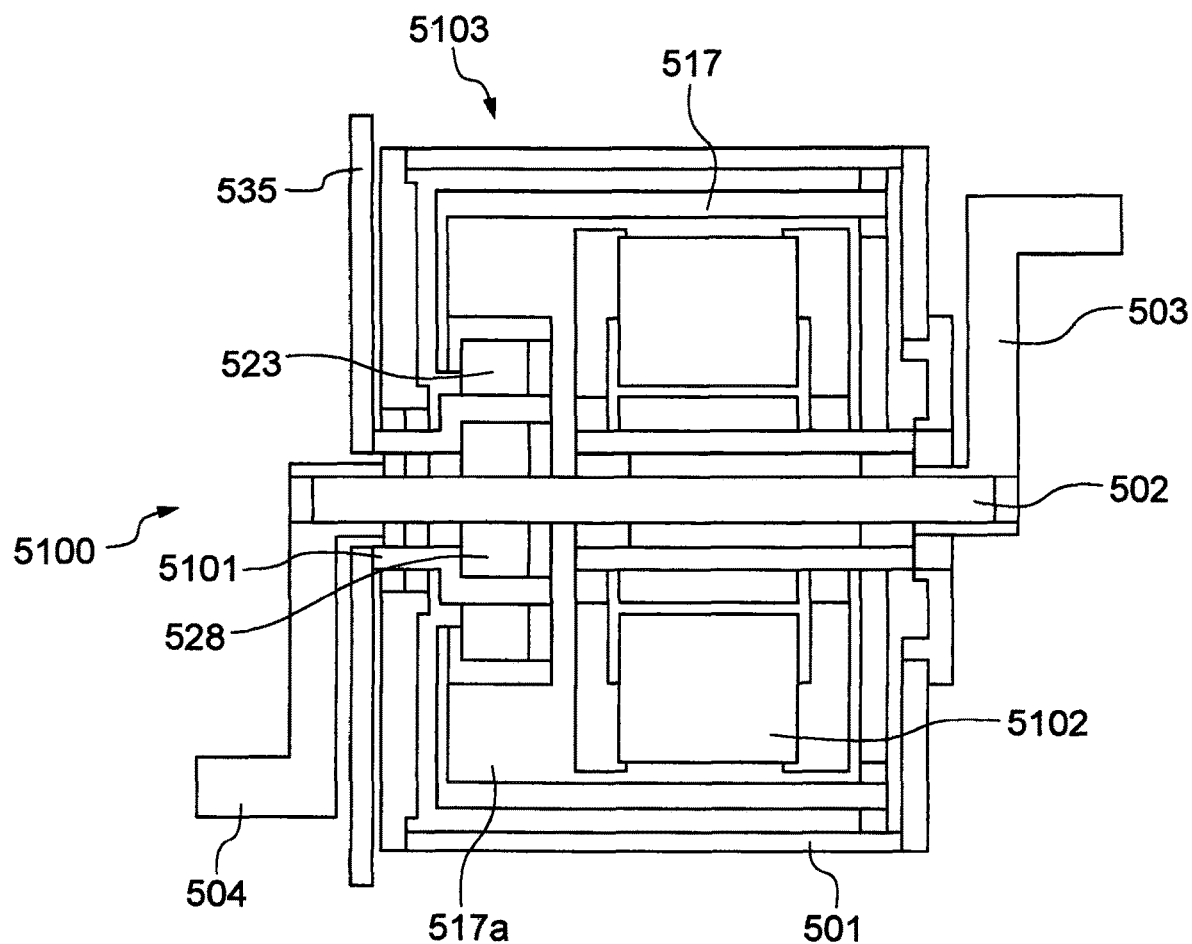
FIG. 14 is a schematic representation of a fifth embodiment transmission system according to the present invention.

A fifth embodiment transmission system 5100 is depicted in FIG. 14. Identical or similarly functioning integers employ a similar numbering scheme albeit prefixed with a "5" or a "50", such that the flex-spline become 517, and the bracket/secondary axle becomes 5101. Similarly functioning components will not be described further as that may be inferred from the above description in relation to the first, second, third and/or fourth embodiments.

In the fifth embodiment system 5100, all of the major components of the system are housed within the locus 517*a* defined by the flex-spline 517. This includes the motor itself as per the fourth embodiment, but also the bearing assembly as per the first embodiment.

It will be appreciated that a slip ring and brush arrangement provided on either side of the wave generator may be used to deliver power to the motor in the fourth and fifth embodiments.

The various embodiment transmission systems described may offer several advantages over prior art systems (numbering from the first embodiment used, but will be appreciated that these may apply to the other described embodiments):

- The transmission system 100 may cater for a number of Motor sizes, such as 290 W and 190 W rated motors;
- The compact size of the transmission system 100 being wholly located within the confines of the bottom bracket shell 1 in the first embodiment being around 80 mm to 110 mm outer diameter, specifically around 90 mm, and 108 mm to 127 mm in length, being specifically around 125 mm in length;
- The transmission system 100 is a complete fully tested unit that is made up externally to the bicycle EB and may even be used to convert older bicycles into electric bicycles where a replacement bottom bracket of the required size is welded into the existing frame;
- The transmission system 100 is assembled into the frame and bottom bracket shell 1 from the drive side, feeding the motor/speed sensor harness that protrudes from the transmission central ring 10 into the frame downtube for further connection to the MCB. There may be a grommet to seal the cable at the point of outlet, and prevent water ingress;
- The MCB being either integral with a removable battery, or located separate to the battery;
- Frame lugs may be used in the frame BB to assist with the desired transmission location as well as helping to prevent rotation of the transmission system in the frame Bottom Bracket. This is not depicted in the present embodiment;
- The transmission system may be secured into place by 3-6 bolts securing the end cap outer 38 to the end cap inner 9 (Non-Drive side), trapping the bottom bracket 1 between the end cap outer 38 (non-drive) and the end cap 31 (drive) with two 'O' rings 39 sealing the assembled unit;
- Alternatively the end cap outer 38 and end cap inner 9 may be threaded, and secured by means of a special tool to rotate and secured by screwing tightly, with thread adhesive similar to LOCTITE® adhesive trapping the frame Bottom Bracket.

This configuration allowing for a fast removal and replacement of the total transmission system in the event of a need for repair, allowing the original transmission to be repaired on a bench in the cycle shop, or on a return to base type operation.

Figure 15:
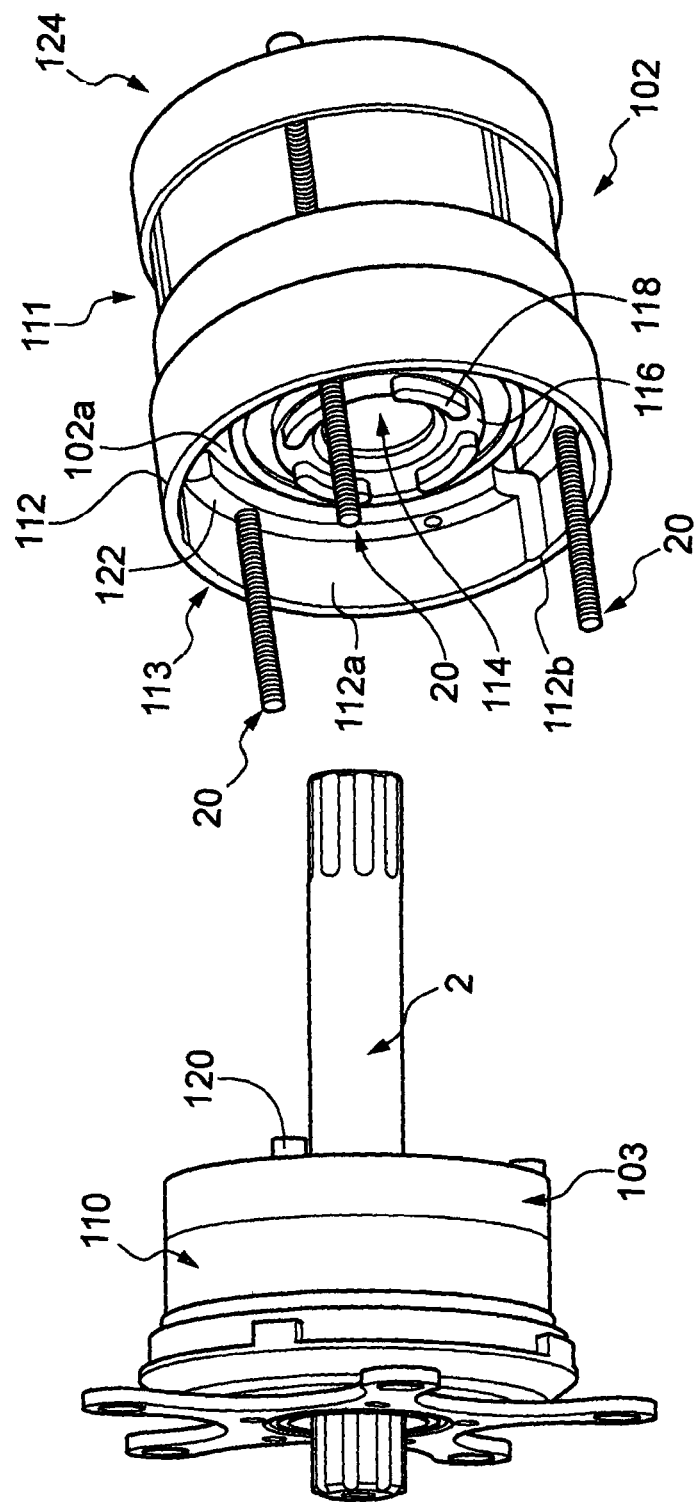
FIG. 15 is a partially exploded perspective view of the modular system of the present invention.

FIG. 15 shows the modular arrangement of the various embodiments, showing a first or "gearbox" module 103 and the second or "motor" module 102.

As can be seen from the Figure, the first or gearbox module 103 houses the main crank axle 2 and within a gearbox module housing 110 there is provided the flex-spline 17, the first one-way clutch 23, the bracket or secondary axle 2101 and the various other components described above. As can be seen, the first module 103 and its housing 110 are generally cylindrical.

The second or motor module 102 houses the electric motor. The motor module 102 has a an outer housing 111 of a generally cylindrical shape. A boss 112 extends from the outer housing 111 from a first end 113. A crank axle aperture 114 is provided through the centre of the motor module 102.

An electric motor toroidal output shaft 116 is located within the boss 112 and around the crank axle aperture 114. Socket projections 118 are formed on the outermost surface of the output shaft 116 to enable engagement with the harmonic drive components situated within the first module 103.

For assembly, crank axle 2 on first module 103 is fed into the crank axle aperture 114 of the second module 102 with bolts 20 feeding into corresponding bolt apertures (not shown). These are secured by mechanical fasteners e.g. nuts (not shown).

The cylindrical housing 110 is received within boss 112.

The inner surface 112a of the boss 112 includes three alignment grooves 112b, which cooperate with guide projections 120 on the first module 102 to ensure proper relative orientation of the two modules 102,103.

An interior rib 122 is provided within the boss 112 adjacent the sidewall 112a and the interior surface 102a of the second module 102. Alignment groove receiving recesses 122a are provided around the rib 122 to receive the projections 120.

Once the two modules 102, 103 are secured together to form the transmission unit 100, it may be fed into the bottom bracket shell 1 of the bicycle EB. End cap 38 is positioned over the motor module 102 at its second end 124 located distally from the first end 113. The end cap 38 secures the transmission system 100 into place within the bottom bracket shell 1.

It will be appreciated that disassembly is a simple reversal of the above steps. The ease by which the transmission system 100 may be removed and reinserted from the system should provide benefits for maintenance and repair, especially since either single malfunctioning modules 102,103 or entire transmission systems 100 may be readily replaced.

It will be understood that this modular construction principle may apply to all described embodiments, and may apply to other harmonic drive based transmission systems.

It is estimated that a transmission system according to the present invention may be removed and replaced new within five minutes, allowing the rider to be put back on the road whilst the faulty transmission system is tested and repaired. The repair shop having replacement units on the shelf to enable this service to be offered.

Figure 16:
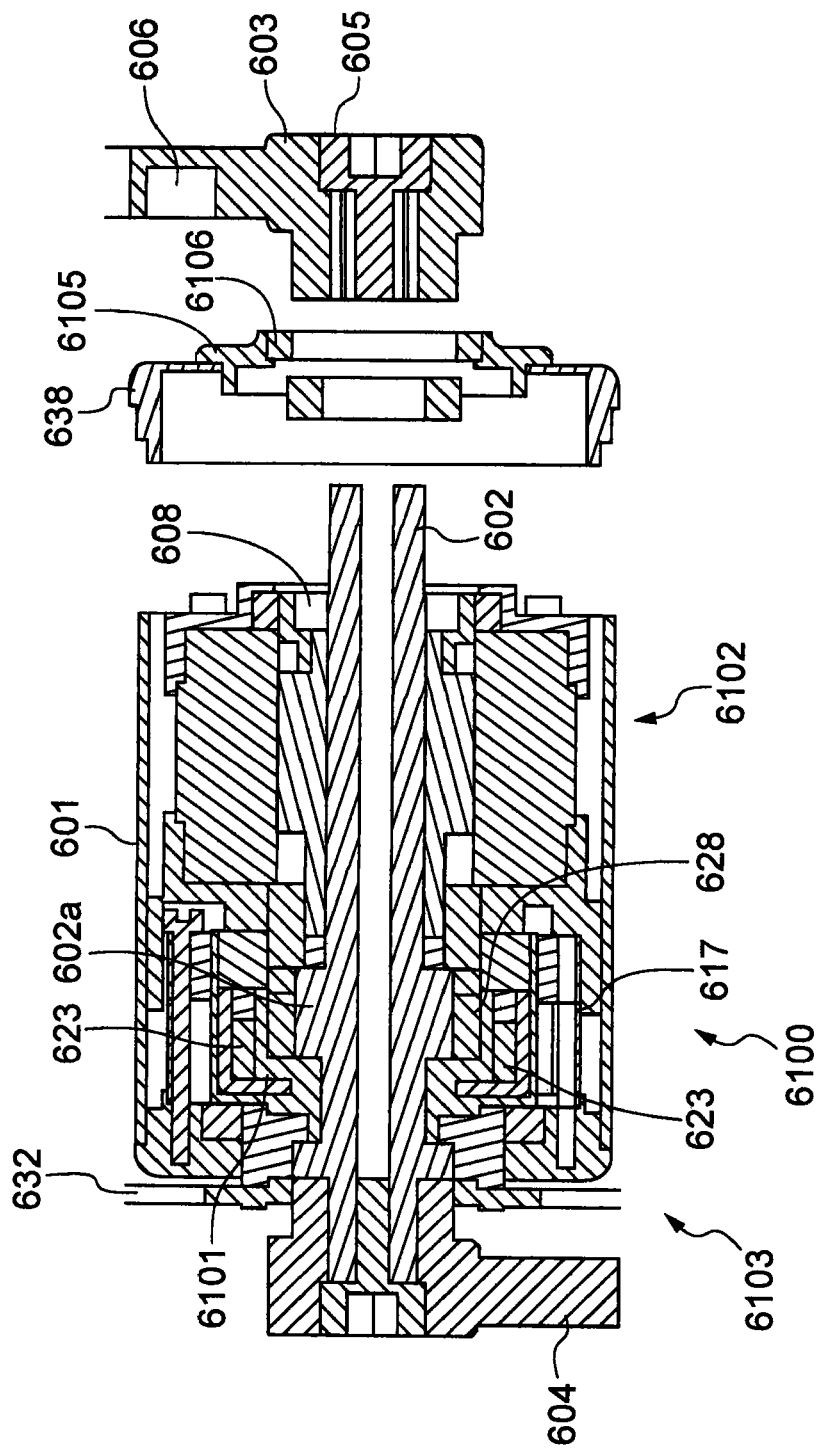
FIG. 16 is a partially exploded sectional side elevation of a sixth embodiment transmission system according to the present invention.

A sixth embodiment transmission system 6100 is depicted in FIG. 16. Identical or similarly functioning integers employ a similar numbering scheme albeit prefixed with a "6" or a "60", such that the flex-spline become 617, and the bracket/secondary axle becomes 6101. Similarly functioning components will not be described further as that may be inferred from the above description in relation to the embodiments described previously.

The sixth embodiment 6100 is largely similar to the second embodiment 2100, in that the one-way clutches 623, 628 are arranged coradial within the locus 617a of the flex-spline 617 about bracket/secondary axle 6101.

The main difference is the addition of a collar 602a, either machined as part of the manufacture of the main drive axle 602 or a separate collar piece which may be adhesively fixed, heat shrunk, keyed or attached with some other suitable fixing method.

The collar 602a is employed to increase the inner race diameter of the one-way clutch 628 mounted on the main axle 602. This allows a larger bearing to be employed which may improve torque handling. Such a collar 602a may also provide a shoulder which locates the axle 602 within the bottom bracket shell 601, and aiding trapping the flex-spline 617 and other parts between crank 604 and collar 602a.

The invention is not limited to the embodiments hereinbefore described, but may be altered in construction or detail.

For example, although described as being sprag clutches, the skilled addressee will appreciate that other one way clutches/bearings may be employed in place of these.

Further, the speed sensor employed may include or comprise a magnetic quadrature sensor and/or an LED rotary encoder.

Further sensors may be provided on the transmission and/or the vehicle/bicycle to measure such quantities as:
which gear the bicycle is in;
the angle of elevation of the bicycle;
weight of bicycle and rider; and
air resistance.

Although described above as a contiguous structure, the bracket/secondary axles may be split into two or more components, which may be joined by threaded portions or locking rings or other suitable fastening methods. This may assist in manufacture and or servicing of the transmission units.

It will be obvious to the skilled addressee that features from each of the described embodiments may be combined to produce further embodiments within the scope of the present invention.

| Numbering | Parts List | Qty |
| --- | --- | --- |
| 1 | Bottom Bracket Shell | 1 |
| 2 | Main Axle | 1 |
| 3 | Pedal Crank (Non-Drive) | 1 |
| 4 | Pedal Crank (Drive) | 1 |
| 5 | Axle Bolt | 2 |
| 6 | Speed Sensor Magnet | 1 |
| 7 | Magnet Retainer (Speed Sensor) | 1 |
| 8 | Main Axle Bearings | 2 |
| 9 | End Cap Inner (Non-Drive) | 1 |
| 10 | Transmission Central Ring | 1 |
| 11 | Bearing (Motor Mount/Secondary Axle) | 2 |
| 12 | Motor Mount | 1 |
| 13 | Motor Windings | 1 |
| 14 | Motor Rotor Magnet Set (On Rotor) | 1 |
| 15 | Motor Rotor | 1 |
| 16 | Harmonic Wave Generator | 1 |
| 17 | Harmonic Flex-spline | 1 |
| 18 | Harmonic Circular Spline | 1 |
| 19 | Bearing Retainer | 1 |
| 20 | Transmission Assembly Bolts | 3 |
| 21 | Sprag Clutch Outer Race | 1 |
| 22 | Sprag Clutch Outer Race Bolts | 5 |
| 23 | Motor Sprag Clutch | 1 |
| 24 | Outer Circlip | 1 |
| 25 | Steel Bearing Race | 1 |
| 26 | Inner Circlip | 1 |

| Numbering | Parts List | Qty |
|---|---|---|
| 27 | Thin Spacer | 1 |
| 28 | Wide Axle Sprag Clutch | 1 |
| 29 | Thin Axle Sprag Clutch | 1 |
| 30 | Thick Spacer | 1 |
| 31 | End Cap (Drive) | 1 |
| 32 | Aluminium Spider | 1 |
| 33 | Spider Fixing Bolts | 5 |
| 34 | Speed Sensor | 1 |
| 35 | Chain Ring | 1 |
| 36 | Chain Ring Bolt Set | 5 |
| 37 | Chain Ring Spacer | 5 |
| 38 | End Cap Outer (Non-Drive) | 1 |
| 39 | O Ring | 2 |
| 40 | Bearing Retainer (Non-Drive) | 1 |
| 41 | End Cap Outer Bolts | 6 |
| 42 | Bearing Retainer Screws | 6 |
| 100 | Transmission System | 1 |
| 101 | Secondary Axle Assembly | 1 |
| 102 | Motor Assembly | 1 |
| 103 | Gearbox Assembly | 1 |
| 104 | Motor Gearbox Assembly | 1 |
| 105 | Securing Ring | 1 |
| 106 | Radial Seal | 3 |

The invention claimed is:

1. A transmission system comprising at least two rotational inputs, and at least one rotational output, one of the rotational inputs being a harmonic drive, the harmonic drive including a flex-spline, the flex-spline surrounding a drive axle of the other rotational input, the flex-spline being rotationally coupled to a first one-way clutch, the first one-way clutch being mounted around and rotationally coupled to a bracket, and a second one-way clutch being mounted within a housing defined within the bracket, and wherein the second one-way clutch is rotationally coupled to the drive axle wherein the flex-spline defines a locus within its interior and wherein the first and/or second one-way clutch are located within that locus.

2. A transmission system according to claim 1 wherein the flex-spline is fixed to the outer race of the first one-way clutch.

3. A transmission system according to claim 1 wherein the flex-spline defines a locus within its interior and the bracket is substantially located within that locus.

4. A transmission system according to claim 1 wherein the flex-spline defines a locus within its interior and the electric motor is substantially located within that locus.

5. A transmission system according to claim 1 wherein the bracket comprises a cylindrical one-way clutch housing and a cylindrical one-way clutch mounting, and wherein the cylindrical one-way clutch mounting and cylindrical one-way housing is capped by a flange.

6. A transmission system according to claim 5 wherein a cylindrical projection extends from said flange, oppositely from the cylindrical mounting and housing.

7. A transmission system according to claim 6 wherein the cylindrical projection is of a lesser diameter than the cylindrical mounting.

8. A transmission system according to claim 6 wherein the cylindrical projection is of a lesser diameter than the cylindrical housing.

9. A transmission system according to claim 6 wherein the cylindrical projection includes a gear mounting.

10. A transmission system according to claim 1 having a maximum length of 170 mm.

11. A transmission system according to claim 1 having a length of between 108 mm to 127 mm.

12. A transmission system according to claim 1 having a length of around 125 mm.

13. A transmission system according to claim 1 wherein the transmission system has a maximum outer diameter of 108 mm.

14. A transmission system according to claim 1 wherein the transmission system has an outer diameter of between 80 mm to 110 mm.

15. A transmission system according to claim 1 having an outer diameter of around 90 mm.

16. A transmission system of claim 1 further including a crank speed sensor.

17. A transmission system according to claim 16 wherein the crank speed sensor employs a magnetic field to derive rotation speed.

18. A transmission system according to claim 16 wherein the crank speed sensor employs a magnetic field to derive rotation direction.

19. A transmission system according to claim 16 wherein the crank speed sensor feeds into a motor controller to control the rotational input provided by the electric motor.

20. A bicycle including at least one transmission system according to claim 1.

* * * * *